United States Patent [19]

Evans

[11] Patent Number: 6,032,640

[45] Date of Patent: Mar. 7, 2000

[54] CONTROL METHOD FOR SPARK-IGNITION ENGINES

[75] Inventor: Robert Lancelot Evans, West Vancouver, Canada

[73] Assignee: The University of British Columbia, Vancouver, Canada

[21] Appl. No.: 09/165,197

[22] Filed: Oct. 2, 1998

[51] Int. Cl.$^7$ .......................... F02B 17/00; F02D 41/14
[52] U.S. Cl. .................. 123/295; 123/297; 123/300; 123/305; 123/431; 123/486
[58] Field of Search ................. 123/27 GE, 295, 123/297, 299, 300, 399, 430, 431, 478, 486, 526, 525, 527, 305

[56] References Cited

U.S. PATENT DOCUMENTS

| | | | |
|---|---|---|---|
| 3,924,598 | 12/1975 | Davis | 123/430 X |
| 4,066,046 | 1/1978 | Mc Alister | 123/297 X |
| 4,418,673 | 12/1983 | Tominari et al. | 123/399 X |
| 4,524,745 | 6/1985 | Tominari et al. | 123/399 X |
| 4,590,912 | 5/1986 | Atago | 123/399 X |
| 4,864,989 | 9/1989 | Markley | 123/267 |
| 4,924,828 | 5/1990 | Oppenheim | 123/299 |
| 5,271,365 | 12/1993 | Oppenheim et al. | 123/267 X |
| 5,450,829 | 9/1995 | Beck | 123/435 |
| 5,555,868 | 9/1996 | Neumann | 123/275 |
| 5,558,062 | 9/1996 | De Minco et al. | 123/399 X |

*Primary Examiner*—Tony M. Argenbright
*Attorney, Agent, or Firm*—C. A. Rowley

[57] ABSTRACT

The control system disconnects the throttle from direct connection with the accelerator pedal, which sets the power requirements or demand. The demand signal passes to a computer control or microprocessor which electronically controls the throttle as a function of the engine operating conditions and pre-established values for controlled parameters stored in bitmaps in the microprocessor's memory. It is preferred to use a fuel injecting stratified charge spark plug in conjunction with the electronic control system and use the electronic control system to control the primary and auxiliary fuel injection systems as well as the ignition timing to permit the engine to run under very lean conditions to produce low levels of emissions such as nitrogen oxides, hydrocarbons, and carbon monoxide.

12 Claims, 5 Drawing Sheets

Brake Power at 2500 rpm using the original Natural Gas line and the New Device

Brake Specific Fuel Consumption at 2500 rpm using the original Natural Gas line and the New Device Thermal Efficiency at 2500 rpm using the original Natural Gas line and the New Device

CONTROL METHOD FOR SPARK-IGNITION ENGINES

FIELD OF INVENTION

The present invention relates to a method of controlling a fuel injected stratified-charge engine, more particularly, the present invention relates to a method of controlling such an engine by injecting a pilot quantity of fuel through the spark-plug, and by remotely adjusting the air fuel ratio to correspond with the operating condition.

BACKGROUND OF THE INVENTION

Fuel injected spark ignition engines operate using computer controls that are controlled using bit maps pre-generated for the specific engine model. The bit maps are based on predefined coordinated degrees of adjustment of the control parameters generally experimentally determined using a particular internal combustion engine and then used on other engines of the same model to set the various parameters such as fuel flow rate, and spark timing. These predefined adjustments are contained within the memory of the engine control module computer in a bit map so that the computer, when it receives input of specific conditions, generates corresponding parameter control positions based on these bit maps or look-up tables.

Generally, such controls read the air mass-flow rate, throttle position, and other parameters and co-ordinate the application of fuel based on these quantities, i.e. the airflow into the internal combustion engine and the other parameters. These control systems generate significant throttling losses and do not provide for accurate control of the air fuel ratio under different load and power demand conditions. In these systems the throttle opening is changed by the operator when there is a desired change in power output or engine speed and then the fuel supply rate is adjusted based on the new throttle opening and airflow rate and the then current load and speed conditions, generally the air to fuel ratio is 1/1 in these systems. U.S. Pat. No. 5,450,829 issued Sep. 19, 1995 to Beck describes an electronic control system for a diesel engine wherein the various operating parameters of the engines are monitored and fed into an electronic engine control unit. The engine control unit then determines pilot fuel flow conditions, i.e. amount and timing, to thereby improve the efficiency of the operation by providing the proper amount of pilot fuel for ignition for the then current cylinder conditions, i.e. air fuel ratio, density, etc. within a cylinder. This system uses calculations to determine some of the controlled adjustments and lookup table or bitmaps for others.

The concept of using dual fuel inputs to spark ignited internal combustion engines are known see for example the system shown in the Markley U.S. Pat. No. 4,864,989 issued Sep. 12, 1989. This patent discloses a spark plug with a fuel injection system to inject auxiliary fuel directly into the spark plugs so that the pilot fuel is adjacent to the spark electrodes and can be ignited to thereby ignite a leaner main fuel mixture contained within the combustion cylinder itself.

BRIEF DESCRIPTION OF THE PRESENT INVENTION

It is an object of the present invention to provide a clean burning spark ignition engine, which can operate over a wide range of air fuel ratios.

More particularly, it is an object of the present invention to provide a method of controlling a stratified charge, fuel injected, spark ignited engine for operation over a wide range of speed and load conditions to obtain some of the key advantages of a diesel engine such as significant reduction of the so called "throttling losses" suffered during operation.

The objects of the present invention are achieved by disconnecting the throttle from the accelerator pedal, i.e. the accelerator pedal which determines the power requirements is detached from the throttle and the throttle is electronically controlled by a microprocessor as a function of the operating condition and is used to provide "fine tuning" of the air fuel ratio to pre-established values as stored in bitmaps in the microprocessor's memory.

It is preferred to use a fuel injecting spark plug in conjunction with the electronic control system and use the electronic control system to control the primary and auxiliary or pilot fuel injection systems as well as the ignition timing to permit the engine to run under very lean conditions to produce low levels of emissions such as nitrogen oxides, hydrocarbons, and carbon monoxide.

Broadly, the present invention relates to a computer control method for controlling a fuel injected spark ignited internal combustion engine wherein at least the parameters of the group comprising engine rpm, air mass flow into the engine, air fuel ratio power demand and engine crank angle are monitored and continuously send signals defining the conditions of each of the parameters at that point in time to a control computer, when a change in power demand is communicated to said control computer a change in rate of fuel supply is initiated and then air mass flow rate is adjusted by adjusting the throttle position to obtain a desired air fuel ratio provided the then current air mass flow rate is not at one of its extreme operating conditions and the required adjustment of air mass flow would exceed such operating condition, said control computer is pre-programmed with predetermined bit mats of rate of fuel supply, spark timing and air mass flow rate for different values of said operating parameters and said control computer controls said engine based on said predetermined bitmaps.

Preferably, the engine will employ a fuel injection spark plug to which auxiliary fuel is injected wherein the amount and timing of auxiliary fuel injection to the spark plug is controlled based on the monitored parameters and the bit-map to obtain a lower air fuel mixture in the region of the spark plug than in the cylinder and the spark timing is controlled together with the amount and timing of auxiliary fuel injection to ignite the auxiliary fuel and subsequently ignite the lean primary fuel mixture within the chamber.

The fuel supply change for both the primary fuel injection and the pilot fuel injection is obtained by changing the opening time or frequency of the two fuel injectors.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
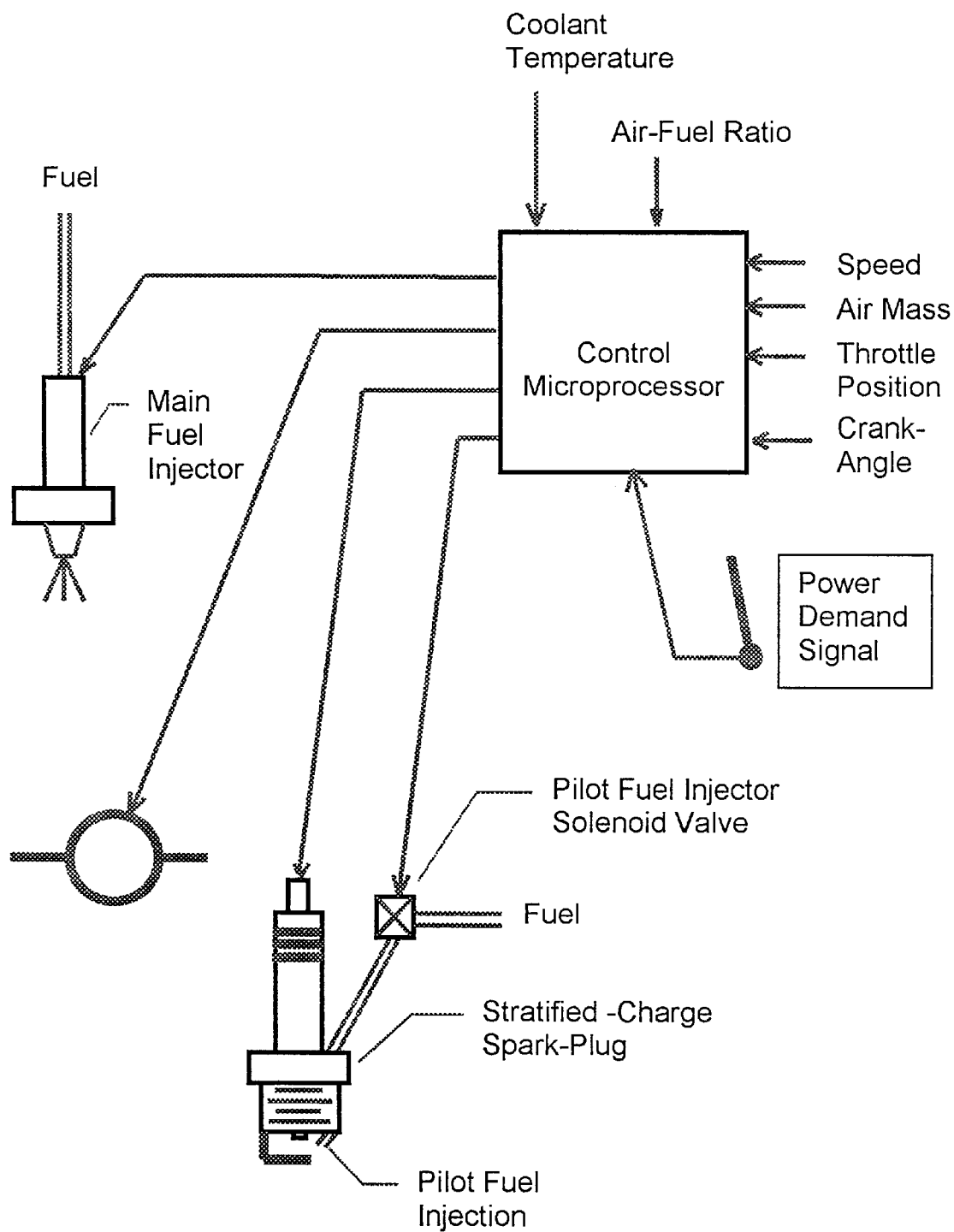
FIG. 1 is a schematic illustration of the main components of the present invention used to form part of the control system of a fuel-injected engine.

In FIG. 1, the fuel and ignition system of a fuel injected, stratified-charge, spark-ignited internal combustion engine burning various types of fuel is shown schematically. The principal components of the engine fuel and ignition system are the electronically controlled throttle, schematically illustrated at 12, the main fuel injector schematically indicated at 14 and the spark plug 16 which in the preferred embodiment is a stratified charge spark plug into which auxiliary or pilot fuel is injected via a pilot fuel injector 18 so that the pilot fuel injected passes by the electrode 20, the arcing of which is controlled as will be described below in relation to the feed of pilot fuel to the plug 16.

While the plug 16 is illustrated as a stratified charge spark plug constructed for auxiliary fuel injection, which is the preferred form of the present invention, the present invention may also be operated with a conventional spark plug. The efficiency when a conventional spark plug is used will not be as effective, i.e. the maximum air to fuel ratio obtainable with a conventional spark plug is less than that obtainable with a stratified charge spark plug with pilot fuel injection.

The engine is controlled by a control microprocessor 22 which receives data on a variety of different parameters including speed 24, air mass flow 26, throttle position 28, crank angle position 30, air fuel ratio 32, coolant temperature 34 as well as a power demand signal from the accelerator pedal as indicated at 36 which signals for an adjustment of the power to be supplied by the engine and may be generated either manually or automatically.

The various parameters fed to the control microprocessor 22 are used to derive a primary fuel injection rate and timing and the microprocessor 22 sends a signal to the main fuel injector 14 via line 38, a signal to the electronic throttle 12 via line 39, and a spark timing and duration signal to the spark plug 16 via the line 40 to set the timing (and in some cases the frequency) of the arcing, e.g. sets the time, frequency and duration of the application of the high voltage arc.

In the system where a stratified charge plug is used as illustrated, a signal is sent to the pilot fuel injector via line 42 to define the timing and amount of fuel injected into the stratified plug 16. This timing is correlated with the timing from line 40 so that the fuel injected by the pilot fuel injector 18 arrives at the arc and is ignited and then ignites the primary air-fuel mixture in the combustion chamber (not shown).

The signal in line 38 defines the timing and duration of the primary fuel injection so that the amount and time at which the main fuel injector injects fuel into the cylinder is controlled. The line 39 sends a signal to the throttle 12 to electronically adjust the throttle opening in response to the air-fuel ratio set-points, as stored in a series of bitmaps in the microprocessor 22.

Figure 2:
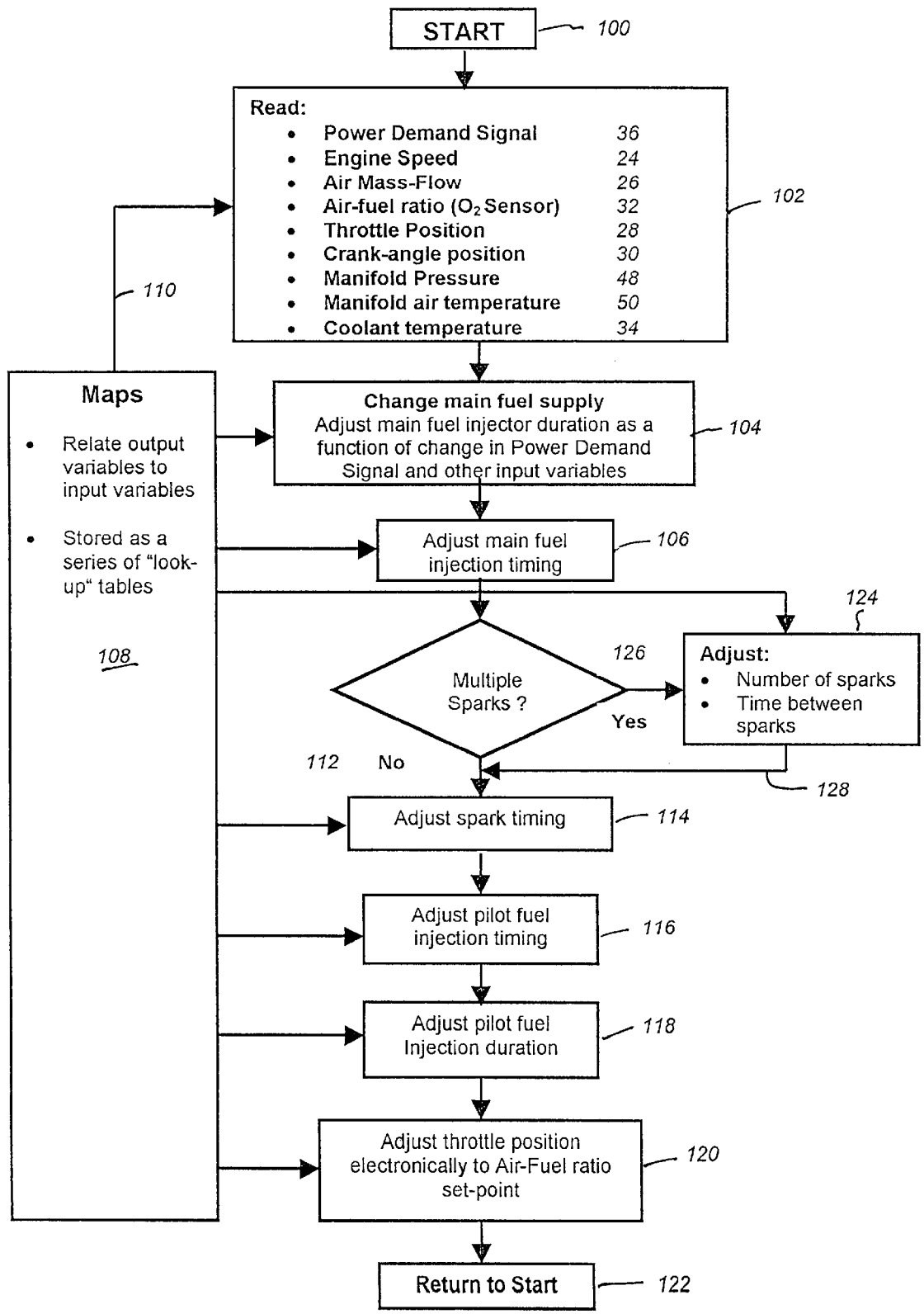
FIG. 2 is a flow diagram of one embodiment of the control system of the present invention.

A typical control operation is illustrated in FIG. 2 as shown after the system is started as indicated at 100 inputs to the control microprocessor 22 include the inputs described above and preferably further inputs such as manifold pressure 48, and manifold air temperature 50.

The control segment 102 receives a power demand signal 36 from the accelerator pedal (or "power" lever for a stationary engine) and the inputs from the various sensors as described above and changes the main fuel supply, i.e. the fuel injector 14 as indicated at 104 and 106 to control both the duration, i.e. the amount of fuel injected as indicated at 104 and the time in the engine cycle, i.e. crank angle position at which the beginning of fuel injection occurs as indicated at 106. These and the other adjustments are made using bitmaps, which are pre-programmed into the control microprocessor 22 and are indicated via the box 108 in FIG. 2. These bitmaps are produced in the conventional manner from engine calibration runs using conventional technology to obtain the desired settings for a given set of parameters indicated at 102 over a full range of engine speed and load conditions. Thus, the information from the inputs indicated at 102 is fed to the bitmap 108 as indicated by the line 110 to select the proper position in the bitmap for each of the different control parameters.

If the system is to be operated with no multiple sparks as indicated at 112, then the spark timing is adjusted as indicated at 114 and where pilot fuel injection is used, i.e. when the stratified charge spark plug 16 is used, the pilot fuel injection timing is set as indicated at 116 and its duration as indicated at 118 and finally the throttle 12 is adjusted as indicated at 120 to adjust the air fuel ratio to the set point as determined by the bitmap 108. Then the process is repeated as indicated at 122. In some cases, it is desirable to adjust the number of sparks and time between sparks as indicated at 124. In the cases where multiple sparks are selected as indicated at 126 the appropriate adjustments are made in 124 based on the bitmap in 108 to provide further input to the spark timing as indicated via the line 128.

It is important that the pilot fuel be injected into the spark cavity of the stratified charge spark plug at the proper time relative to the spark timing, i.e. arcing of the spark plug as above indicated so that the auxiliary or pilot fuel is in proper position relative to the arc being formed to ensure that an easily ignitable air to fuel ratio is present at the point of arcing at the appropriate time to ensure ignition of the pilot fuel and that the burning auxiliary fuel is carried forward into the cylinder to ignite the primary fuel injected by the injector 14.

EXAMPLES

Tests were carried out with the present invention and compared the present invention with the prior art using natural gas as the fuel supply and employing a stratified charged spark plug. The tests were conducted in a Ricardo Hydra single-cylinder research engine, with a specially constructed stratified-charge spark plug. The engine is instrumented with electronic transducers from the which the signals are fed into a personal computer via a data acquisition board. The data acquisition system allows simultaneous measurement of all major engine parameters including torque, speed, air and fuel flow rates, pressures, temperatures, spark advance and duration of injection. In addition to the existing engine control console a new control unit designed to control the pilot fuel injection system, as well as a multiple spark generation system, was designed and installed. A wide-range oxygen sensor (a λ sensor) was installed in the exhaust to provide a further check on the air-fuel ratio as determined from the fuel and air flow measurements. Tests were run both with the stratified-charge spark plug system, as described here, and with a conventional spark plug as a homogenous charge engine. For the test results shown here the engine was operated at a speed of 2500 rpm with a wide-open throttle, and the fuel flow rate was adjusted to vary the air-fuel ratio from stoichiometric ($\lambda$=1.0) to the lean limit of combustion. As there was very little difference between the two systems from $\lambda$=1.0 to $\lambda$=1.4, only data from $\lambda$=1.4 to the lean limit of combustion are shown.

Figure 3:
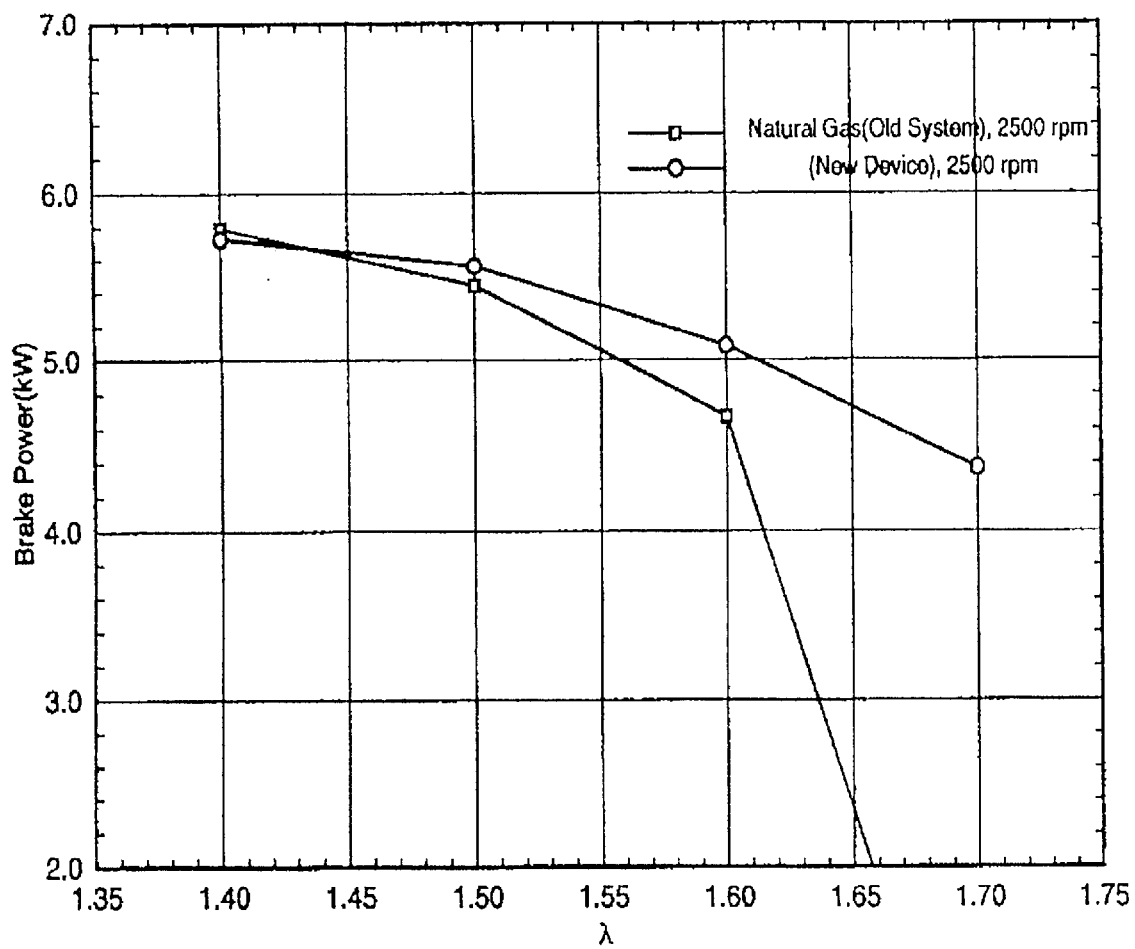
FIG. 3 is a plot of brake power versus relative air-fuel ratio, $\lambda$, showing the effectiveness of the present system versus a conventional system.

As shown in FIG. 3, the present invention is able to operate at air to fuel ratios that are relatively high compared to the conventional engine. The present invention developed about 4 kW at $\lambda$ 1.7 but the conventional engine was unable to operate with such a lean mixture. Even at lower $\lambda$ i.e. 1.6, the brake horsepower generated by the present invention was about 5.1 kW whereas with the prior art device, it was only 4.8 kW and dropped off very quickly due to misfiring as $\lambda$ was increased.

Figure 4:
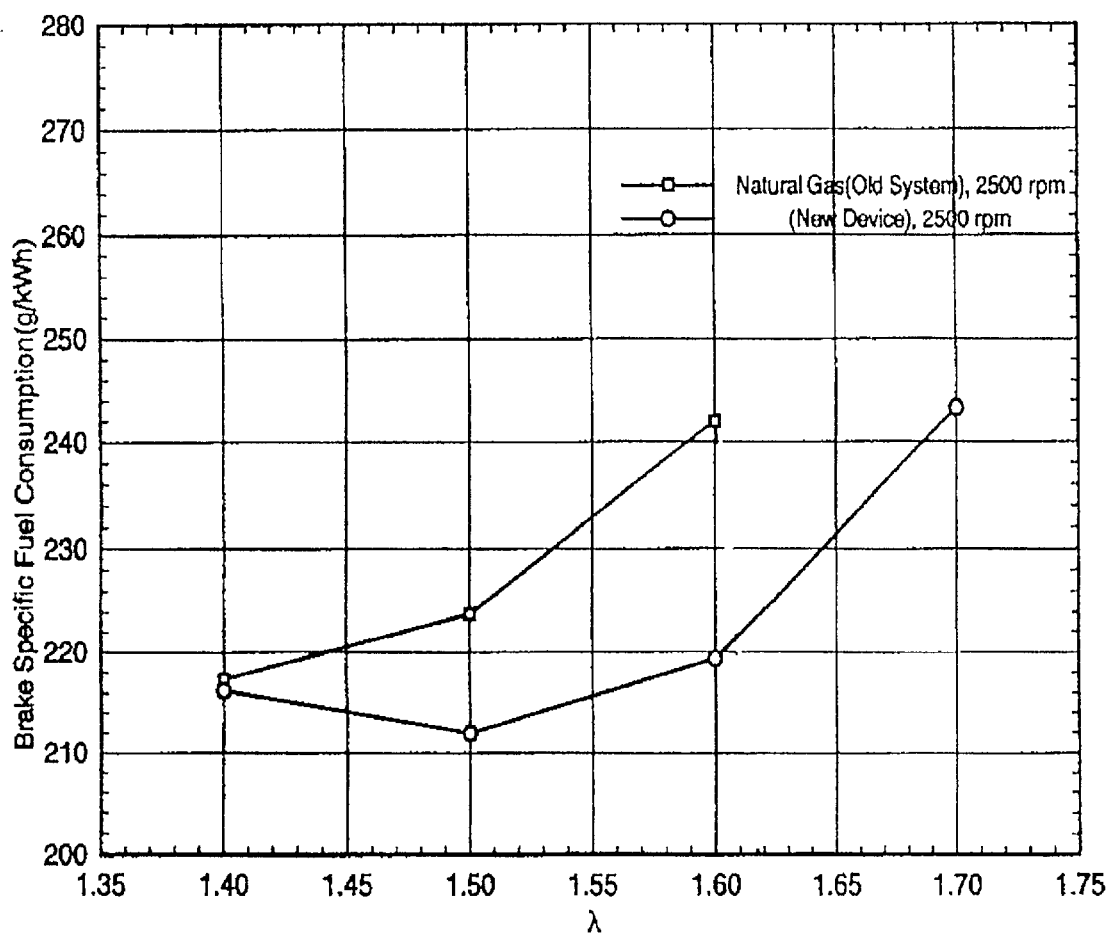
FIG. 4 is a plot of brake specific fuel consumption versus relative air-fuel ratio $\lambda$.

The plot of brake specific fuel consumption in grams per kW hour plotted in FIG. 4 shows that with the present invention, the specific fuel consumption at $\lambda$ above 1.4 was significantly reduced compared to that of the conventional engine. It can be seen that with the present invention the engine can be run much more efficiently than a conventional engine running at the same air-fuel ratio (e.g. At $\lambda$=1.6), or can be operated at much leaner air-fuel ratios to further reduce exhaust emission levels.

Figure 5:
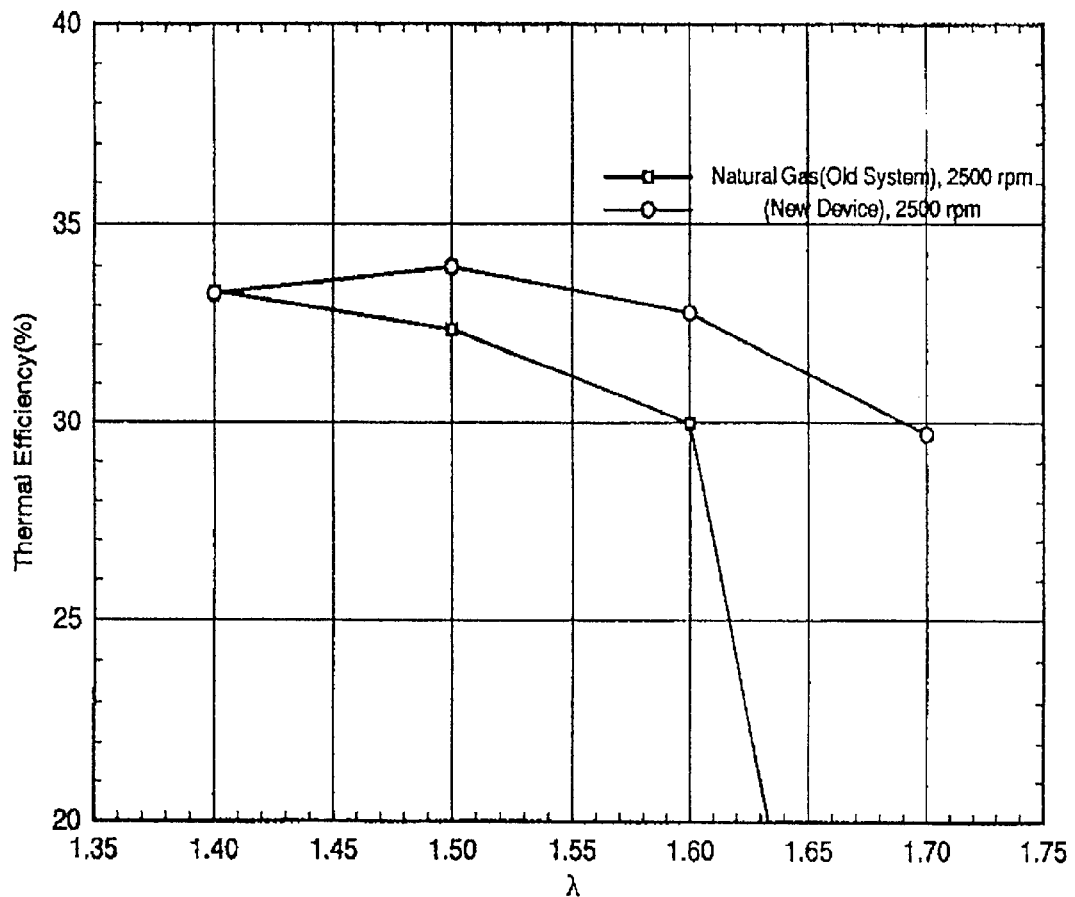
FIG. 5 is a plot of thermal efficiency versus relative air-fuel ratio λ comparing the present invention with the conventional system.

FIG. 5 clearly demonstrates that the thermal efficiency of the present invention is significantly higher, remains relatively constant over the whole operating range of $\lambda$ i.e. from $\lambda$=1.4 to 1.7. The thermal efficiency actually increased between $\lambda$=1.4 and $\lambda$=1.5 and was about the same at $\lambda$=1.4 and $\lambda$=0.6 and was slightly lower at $\lambda$=1.7 whereas with the conventional engine at $\lambda$ above 1.4, the thermal efficiency dropped off steadily until about $\lambda$=1.6 then it dropped off very rapidly as the engine becomes inoperative at these high air to fuel ratios.

Having described the invention, modifications will be evident to those skilled in the art without departing from the scope of the invention as defined in the appended claims.

We claim:

1. A computer control method for controlling a stratified charge fuel injected spark ignited internal combustion engine having at least one cylinder each of said at least one cylinders having a spark plug, said engine having a primary fuel injector and a separate auxiliary fuel injector for each of said at least one cylinder for injecting a small quantity of fuel into each cylinder of said at least one cylinder adjacent to its spark plug, said method comprising monitoring at least the parameters of the group comprising engine rpm, air mass flow into the engine, air fuel ratio, power demand and engine crank angle and continuously sending signals defining the conditions of each of the parameters at that point in time to a control computer, inputting a change in power demand signal to said control computer, changing primary fuel supply in accordance with said change in power demand signal and adjusting air mass flow rate to obtain a desired primary air fuel ratio fed to said engine provided the then current air mass flow rate is not at one of its extreme operating conditions and the required adjustment of air mass flow would exceed such operating condition, said control computer being pre-programmed with predetermined bit maps of rate of fuel supply, spark ignition and air mass flow rate for different values of said operating parameters and said control computer controlling said engine based on said predetermined bitmaps, said computer controlling the amounts and timings of primary and auxiliary fuel injected by said primary and auxiliary fuel injectors based on said monitored parameters and said predetermined bitmap to obtain an auxiliary air fuel mixture adjacent to said spark plug in said at least one cylinder having an air fuel ratio lower than that of a primary air fuel mixture formed by fuel injected by said primary injector, co-ordinating timing of auxiliary fuel injection with timing of spark discharge of said spark plug in each of said at least one cylinders, igniting said auxiliary air-fuel mixture and said ignited auxiliary air-fuel mixture igniting said primary air-fuel mixture.

2. A computer control method as defined in claim 1 wherein said change in primary fuel supply is controlled by said computer by changing the timing of the beginning of primary fuel injection and duration of primary fuel injection.

3. A computer control method as defined in claim 1 wherein said injection of said auxiliary fuel is through a fuel injection spark plug.

4. A computer control method as defined in claim 1 wherein said change in primary fuel supply injection is followed by a change in said adjusting air mass flow rate.

5. A computer control method as defined in claim 2 wherein said change in primary fuel supply injection is followed by a change in said adjusting air mass flow rate.

6. A computer control method as defined in claim 3 wherein said change in primary fuel supply injection is followed by a change in said adjusting air mass flow rate.

7. A computer control method as defined in claim 1 wherein said spark discharge comprises a multiple spark discharge.

8. A computer control method as defined in claim 2 wherein said spark discharge comprises a multiple spark discharge.

9. A computer control method as defined in claim 3 wherein said spark discharge comprises a multiple spark discharge.

10. A computer control method as defined in claim 4 wherein said spark discharge comprises a multiple spark discharge.

11. A computer control method as defined in claim 5 wherein said spark discharge comprises a multiple spark discharge.

12. A computer control method as defined in claim 6 wherein said spark discharge comprises a multiple spark discharge.

* * * * *